United States Patent Office 3,721,350
Patented Mar. 20, 1973

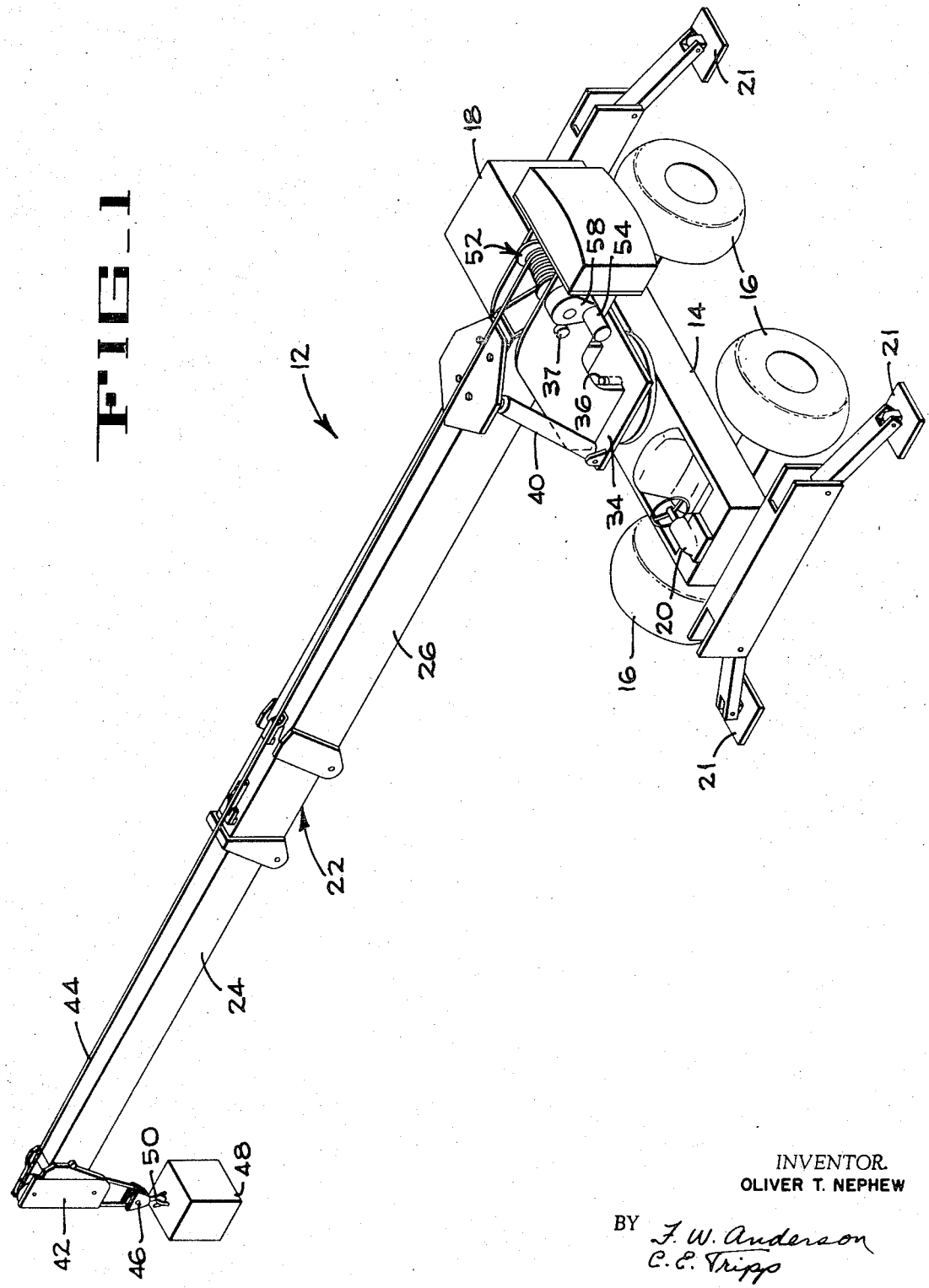

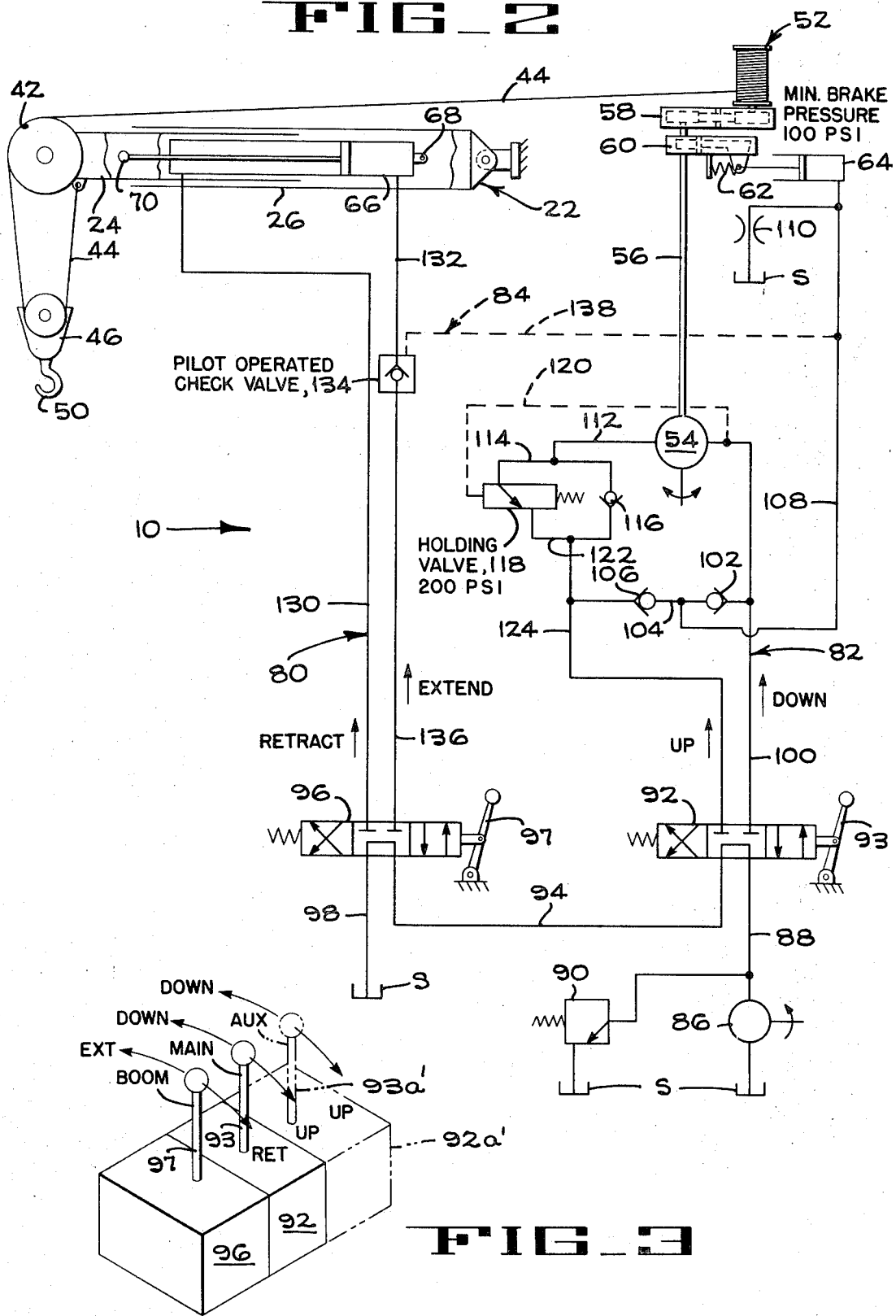

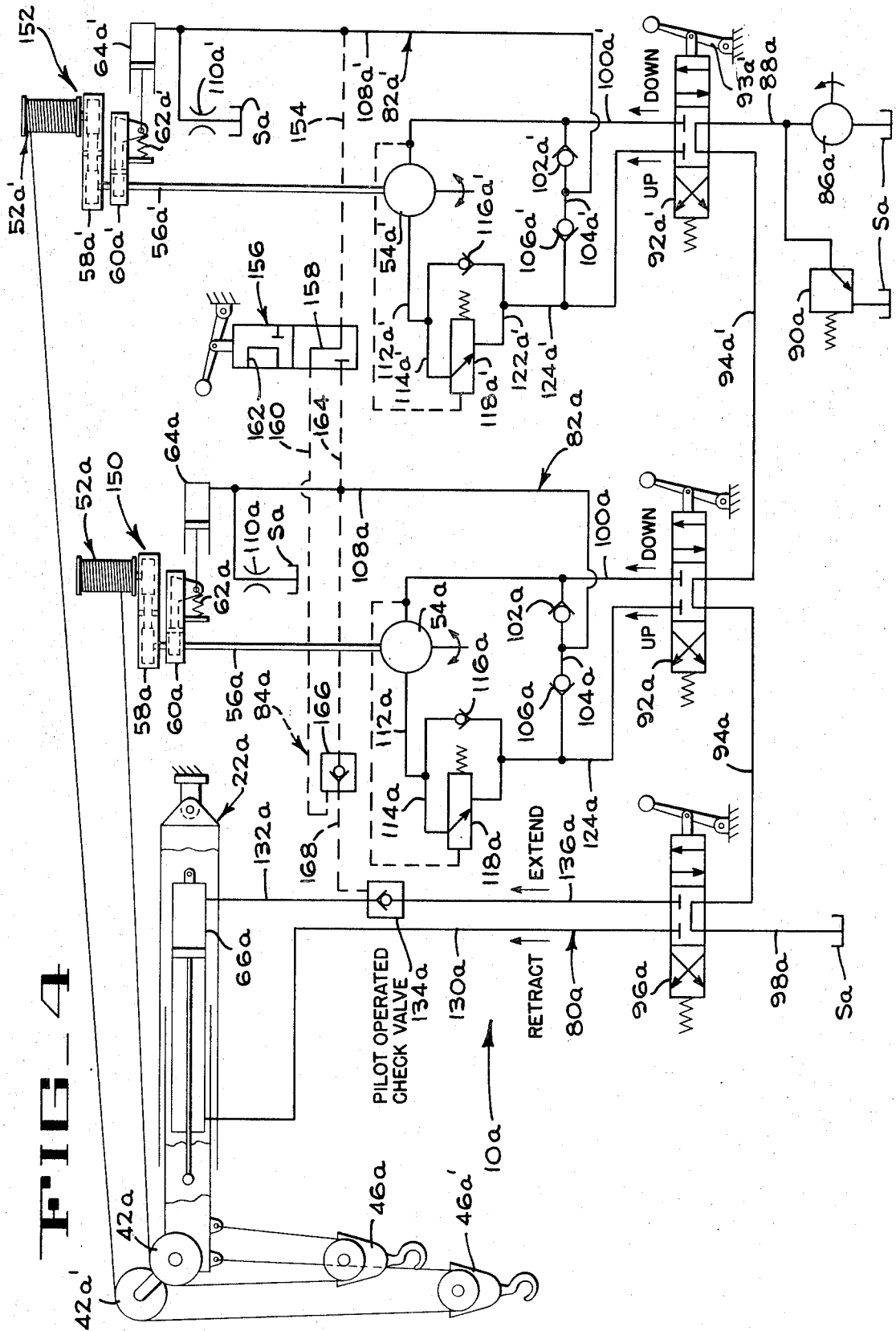

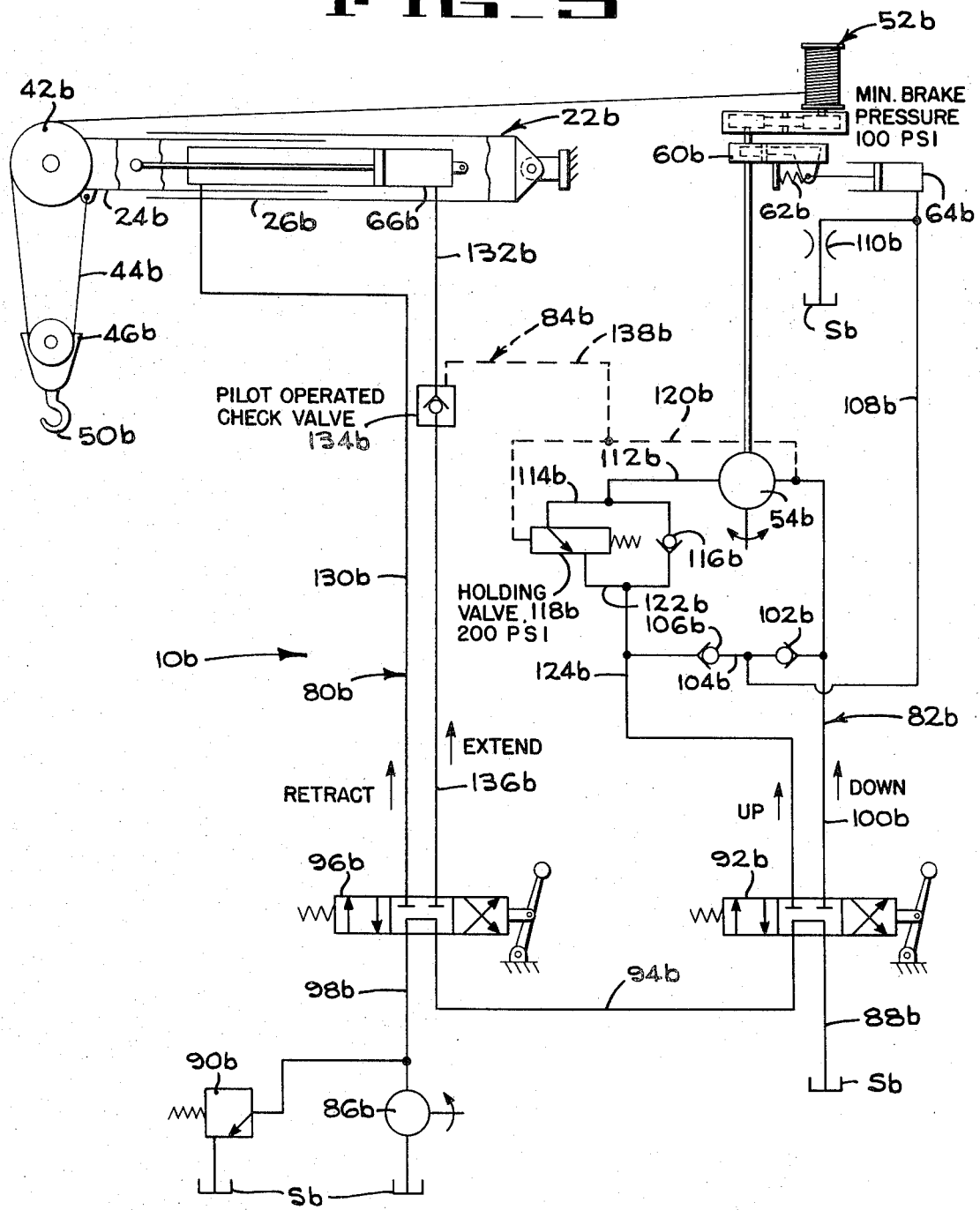

3,721,350
BOOM EXTENSION CONTROL SYSTEM
Oliver T. Nephew, Cedar Rapids, Iowa, assignor to FMC Corporation, San Jose, Calif.
Filed Feb. 12, 1970, Ser. No. 10,961
Int. Cl. B66c 23/06
U.S. Cl. 212—55    5 Claims

ABSTRACT OF THE DISCLOSURE

A boom extension control system for employment with hydraulically extensible booms having hydraulic load lifting cable winches effective to provide an interlock between the boom and winch controls whereby extension of the boom is prevented until the winch is operated.

CROSS REFERENCE TO RELATED APPLICATIONS

The boom extension control system of the present invention is intended for use with a mobile crane of the type disclosed in Chalupsky et al. application Ser. No. 780,993, which application was filed Dec. 4, 1968 and is assigned to the assignee of the persent invention.

BACKGROUND OF THE INVENTION

Field of the invention

The present invention relates to cranes and more particularly to a control system for operation of an extensible boom and a winch in a crane.

Description of the prior art

Much effort and crane design has been directed to a problem known as "two-blocking" or "double-blocking." This condition occurs when the lifting block on the end of the winch cable or line is brought into contact with the end of the boom by either extension of the boom, reeling in of the cable, or a combination of both. "Two-blocking" frequently results in damage to the winch, winch motor and cable. Presently available systems which solve this problem, partially or entirely, are generally complex combinations of hydro-mechanical and electrical controls that restrict the flexibility of the system, increase the cost of purchase as well as the maintenance cost of the system, and exhibit low reliability due to their complexity and the environment in which cranes are generally operated.

One of the simpler boom control systems is described by Stauffer in U.S. Pat. 3,315,820. The winch is provided with a one-way clutch to prevent unreeling of the cable which may be released either by the winch motor hydraulic circuit when powered in the down direction or by the boom extension circuit whenever the boom is extended. A by-pass relief valve 70 is mounted across the winch motor 27 which permits the cable to be stripped off the winch and the motor to be driven backwardly as a pump when two-blocking occurs due to extension of the boom cylinder. The relief pressure of valve 70 must necessarily be set quite high near the limit of the tensile strength of the winch cable to prevent creeping or dropping of the load whenever the boom cylinder is independently actuated since the winch brake is simultaneously released with extension of the boom cylinder.

SUMMARY OF THE INVENTION

It has been determined that the operators of cranes are alert as to the position of the lifting block when operating the winch. Thus, the danger of "two-blocking" at this time is minimal. However, the operators tend to forget that extension of he boom also causes the lifting block to move upwardly in a direction which might cause "two-blocking" and, accordingly, the operator sometimes rapidly extends the boom resulting in violent "two-blocking" and damage to equipment.

In accordance with a first embodiment of the boom extension control system of the persent invention a hydraulic interlock is inserted in the hydraulic system for controlling a boom extension cylinder, a winch brake release cylinder, and a reversible hydraulic winch motor. Separate operator controlled hydraulic valves are provided for extending or retracting the boom, and for releasing the winch brake and activating the winch motor. By opening the valves different amounts, the operator may drive the boom and winch at different speeds. The hydraulic interlock interconnects a boom actuating circuit and a winch actuating circuit and allows extension of the boom only after the operator has consciously manipulated the controls to release the winch brake and activate the winch motor. Thus, in accordance with the first embodiment of the invention the boom cannot inadvertently be extended until the operator actuates the winch motor causing the lifting block to move either up or down at which time the operator is alert as to the position of the lifting block.

The second embodiment of the invention includes an extension control system for controlling the extension of a boom having two separate, independently operated winch and block systems mounted on the same boom. The hydraulic interlock is connected in this system in such a way as to preclude extension of the boom unless the hydraulic winch motors of both winch and block systems are operating in either direction.

The third embodiment of the invention is the same as the first embodiment except that the interlock is arranged to permit boom extension only when the operator controls the winch motor so that the winch is driven in a direction which will lower the lifting block.

BRIEF DESCRIPTION OF THE DRAWINGS

FIG. 1 is a diagrammatic perspective of a mobile crane having an extensible boom and a single block and winch assembly mounted thereon.

FIG. 2 is a schematic view of an extensible boom, winch, and hydraulic control system of the present invention.

FIG. 3 is a diagrammatic perspective showing the directional relationship of the control handles for the boom and winch.

FIG. 4 is a schematic view similar to FIG. 1 showing a second embodiment of the invention when two winches are employed.

FIG. 5 is a schematic view of an extensible boom, winch and hydraulic control system similar to FIG. 2 modified to illustrate a third embodiment of the invention.

DESCRIPTION OF PREFERRED EMBODIMENT

The boom extension control system 10 (FIG. 2) of the present invention is employed in a mobile crane 12 of the type disclosed in FIG. 1. The crane includes a frame 14 mounted on wheels 16 for transportation from place to place. The crane also includes an engine 18 and the usual transmission and drive controls which are generally designated by the numeral 20. Prior to placing the crane in operation for lifting objects, outriggers 21 located at the four corners of the frame 14 are lowered to provide a wider and more stable support for the crane.

A telescoping boom 22 having at least a terminal portion 24 and a base portion 26 is pivotally supported by a turntable 34 for horizontal pivotal movement about an axis 36 and for vertical pivotal movement about an axis 37. Vertical pivotal movement is controlled by two hydraulic cylinders 40 (only one cylinder being shown), and horizontal pivotal movement is controlled by a hydraulic cylinder (not shown). A head block 42 (FIGS. 1 and 2)

is mounted on the free end of the terminal portion 24 of the boom 22 and has the free end of a cable or line 44 fixed thereto and trained around one or more pulleys in the head block and around associated pulleys in a lifting block 46 in the usual manner and as diagrammatically illustrated in FIG. 2. The load 48 (FIG. 1) is supported by a hook 50 on the lower end of the lifting block 46.

The cable 44 is wound around a winch 52 journaled on the turntable 34. The winch 52 is driven by a reversible hydraulic motor 54 through a drive shaft 56 and gear box 58 as diagrammatically illustrated in FIG. 2. A brake 60 of standard well known design includes a spring 62 which normally locks the winch 52 from movement in either direction, and a hydraulic winch brake cylinder 64 is provided to release the brake when activated.

A boom extension cylinder 66 is operatively connected to the base portion 26 at 68 and to the terminal portion 24 at 70 and upon activation will telescopically extend or retract the boom 22.

In accordance with the present invention the boom extension control system 10 (FIG. 2) is provided for the purpose of controlling the operation of the boom 22 and winch 52 so that inadvertent extension of the boom is prevented until the operator consciously operates the winch.

The boom extension control system 10 (FIG. 2) of the first embodiment of the invention may broadly be considered to include a boom actuating circuit 80 and a winch actuating circuit 82 interconnected by an interlock circuit 84.

The system 10 includes a driven hydraulic pump 86 which draws hydraulic fluid from a sump S and directs the fluid into the control system through a high pressure conduit 88. If the pressure within the circuit exceeds about 2000 p.s.i., a pressure relief valve 90 opens to permit the fluid to return directly into the sump S. The high pressure conduit 88 is connected to a manually operated, spring centered, four-way winch valve 92 having a control handle 93 which when in the illustrated neutral position allows high pressure fluid to flow through a conduit 94 into a second manually operated, spring centered four-way boom valve 96 having a control handle 97. When both valves are centered, the high pressure fluid returns to the sump S through conduits 94 and 98. Both four-way valves 92 and 96 may be adjusted by the operator to a parallel passage position or a crosspassage position during which time the fluid flows therethrough in the direction indicated by the arrows. It will also be understood that the four-way valves may be partially or fully opened by the operator by pivoting the valve handles 93 and 97 lesser or greater amounts thereby controlling the rate of flow of fluid therepast.

If it is desired to move the winch 52 in a direction which will lower the lifting block 46, the valve 92 of the winch actuating circuit 82 is moved to the parallel passage position. Fluid then flows through a conduit 100, through a check valve 102, into a conduit 104 where it is blocked by check valve 106 but flows through conduit 108 to the single acting winch brake cylinder 64 thereby exerting sufficient pressure to release the brake 60. A hydraulic pressure of about 100 p.s.i. in the cylinder 64 is sufficient to overcome the pressure of the spring 62. A drain orifice 110 is connected between the conduit 108 and sump S and is provided for the purpose of allowing fluid to be discharged from the brake cylinder 64 thereby relieving pressure in conduit 108 which permits the brake to lock shortly after the valve 92 is moved to its illustrated neutral position. It will, of course, be understood that a small amount of fluid will flow through the drain orifice 110 when the hydraulic motor 54 is operating but this flow is insignificant. The drain orifice 110 is adjusted to maintain the pressure at the brake cylinder 64 above about 100 p.s.i. when fluid is flowing through either the parallel or crosspassage positions of the winch valve 92.

When the valve 92 is in its parallel passage position, high pressure fluid also flows through conduit 100 into the hydraulic motor 54 thereby driving the motor in a direction which will transmit power through the shaft 56 and gear box 58, and will drive the winch 52 in a direction which will unwind the cable and lower the lifting block 46.

In order to prevent the load on the lifting block 46 from causing the motor 54 to allow the winch to unwind at high speed, the fluid discharged from the motor 54 flows through conduits 112 and 114 and is prevented from flowing directly into the sump S by a check valve 116. Instead, the fluid discharged from the hydraulic motor 54 flows through a normally closed pilot operated holding valve 118. The valve 118 is opened by pressure transmitted through a pilot line 120 when the pressure at the input end of the hydraulic motor 54 is at least about 200 p.s.i. The fluid discharged from the motor then flows through the holding valve 118, through conduits 122, 124, 94, and 98 to the sump S.

When it is desired to raise the lifting block 46, the winch control valve 92 is moved to the crosspassage position. High pressure fluid then flows from conduit 88, through conduit 124, check valve 106, conduit 108 and into the winch brake cylinder 64 to release the winch brake 60. During this time a small amount of fluid flows through the drain orifice 110 and is returned to the sump S. High pressure fluid also flows from conduit 124, through check valve 116, conduits 114 and 112, and the hydraulic motor 54 which drives the shaft 56 and the gears in the gear box 58 in a direction which will rotate the winch in a direction raise the lifting block 46. Hydraulic fluid from the motor 54 returns to the sump S through conduit 100, a cross-passage in winch valve 92, and conduits 94 and 98.

When it is desired to operate the boom 22, the boom actuating circuit 80 is energized. In this regard, if it is desired to retract the boom 22, the operator manipulates the lever 97 (FIGS. 2 and 3) to shift the boom valve 96 into the cross-passage position. High pressure fluid then flows from the pump 86 through conduits 88 and 94, through a cross-passage in the valve 96 and through a conduit 130 into the piston rod end of the cylinder 66 thereby causing the boom cylinder 66 to retract the boom 22. Fluid on the other side of the piston is returned to the sump S through a conduit 132, a pilot actuated check valve 134, a conduit 136, a cross-passage in the valve 96, and the conduit 98.

When it is desired to extend the boom 22, the lever 97 is actuated to place the boom valve 96 in its parallel passage position thereby causing high pressure fluid to flow through conduit 136, through the pilot actuated check valve 134, if the check valve is activated in a manner to be described hereinafter, into the closed end of the boom cylinder 66 to thereby extend the boom 22. The fluid in the other end of the cylinder 66 returns to the sump S through conduits 130 and 98.

An important feature of the first embodiment of the invention is the incorporation of the interlock circuit 84 between the boom actuating circuit 80 and the winch actuating circuit 82, which interlock circuit 84 prevents extension of the boom 22 unless the hydraulic motor 54 is activated and the brake 60 is released.

The interlock circuit 84 comprises the pilot actuated check valve 134 and a pilot line 138 connecting the check valve 134 to the conduit 108 of the winch actuating circuit 82. The pilot operated check valve is of standard well known design and may be of the type manufactured by Racine Hydraulics & Machinery Inc., of Sarasota, Fla. and identified as their 1600 series single pilot check valve, which valve requires a 12 to 1 ratio between line pressure and pilot pressure for opening. This pilot operated check valve 134 will allow fluid to flow freely from conduit 132 to conduit 136 at all times thus allowing the boom to be retracted at any time independently of the operation of the winch 52. However, the check valve 134 will preclude flow from the conduit 136 to conduit 132 unless a pilot pressure in pilot line 84 is at least 1/12 of the operating pressure in line 136. Thus, the pilot pressure must be at least 166 p.s.i. if the system is operating at its maximum pressure of 2000 p.s.i. As mentioned above, the pressure required to open the brake 60 is about 100 p.s.i. Accordingly, the brake 60 must be released and the hydraulic motor must be driven, in either direction, to maintain a pressure of at least 100 p.s.i. in the conduit 108. When the pilot pressure is at its minimum 100 p.s.i. brake releasing pressure, which might occur if the valve 92 is adjusted so that very little fluid flows therepast, it will be recognized that the pilot operated check valve 134 will open and the boom may be extended when the pressure in the line 136 is about 1200 p.s.i. It will be understood, of course, that the pressure within the conduit 108 is usually much greater than 100 p.s.i. when the valve 92 is opened.

In operation of the first embodiment of the boom extension control system 10 (FIG. 2) of the present invention it will be assumed that a load is supported by the boom 22 and the lifting block 46, that the winch 52 has previously been operated to lift the load free of the ground, and that the winch valve 92 has been returned to its neutral position. The orifice 110 will then allow the pressure within the winch actuating circuit 82 to drop well below 100 p.s.i. causing the spring 62 to move the brake 60 into locking engagement with the shaft 56. The hydraulic motor 54 will, therefore, be stationary at this time.

If the operator then desires to extend the boom 22, movement of the boom valve 96 into the parallel passage position will merely direct high pressure hydraulic fluid from the pump 86 through conduits 88 and 94, a parallel passage in the valve 96, through conduit 136, and into the pilot operated check valve 134 which stops further flow of the fluid since the pressure in the pilot line 138 is not great enough to open the check valve 134. Thus, the boom cannot be extended by merely moving the valve 96 to its parallel passage position. The pressure in conduit 136 will immediately raise to the system pressure of 2000 p.s.i. thereby opening pressure relief valve 90.

In order to extend the boom the operator must not only actuate the boom valve 96 but also must actuate the winch valve 92 by either placing the winch valve in its parallel passage position or in its cross-passage position thereby either lowering or raising the lifting block. If the operator places the winch valve 92 in the parallel passage position, the pressure within the high pressure portion of the winch actuating circuit 82 will almost immediately raise to above at least 200 p.s.i. by virtue of the holding valve 118. This pressure is transmitted from the conduit 108 through the pilot line 138 to the pilot operated check valve 134 and is sufficient to open the check valve thereby extending the boom 22 at a rate determined by the amount the lever 97 is moved to the left (FIGS. 2 and 3) by the operator. Similarly, the operator may regulate the rate at which the cable is reeled out by moving the lever 93 of winch valve 92 to the left (FIGS. 2 and 3) the desired amount.

If the operator wishes to raise the load while extending the boom 22, he maintains the valve 96 in the parallel passage position and also moves the winch valve 92 to the cross-passage position. The pressure would then almost immediately raise 200 p.s.i. in conduit 108 and conduit 112 thus releasing the brake 60 and causing the winch 52 to move in a direction which will raise the lifting block 46. Since the boom valve 96 is held in the parallel passage position by the operator at this time, the fluid is momentarily blocked by the pilot operated check valve 134 from returning to the sump S, except for a small amount of fluid which flows into the sump S through the orifice 110. However, the pressure rapidly builds up in the conduit 108 and pilot line 138 to above 166 p.s.i. thereby providing sufficient pilot pressure to open the pilot valve 134 thus permitting extension of the boom 122.

As mentioned previously, when the operator is manually actuating the winch valve 92 his attention is focused upon the position of the lifting block 46 thus substantially eliminating danger of "two-blocking" which might occur through inattention if the boom could be extended without at the same time operating the winch 52.

It is of course understood that the winch 52 may be operated independently of the boom 22, and that the boom may be retracted at any time independently of the operation of the winch 52.

The boom extension control system 10a (FIG. 4) of the second embodiment of the invention is quite similar to the system 10 of the first embodiment of the invention except that the second embodiment is provided for controlling boom extension when two separate and independent winch and block systems are mounted on a single boom, i.e., when a main winch and block assembly 150 and an auxiliary winch and block assembly 152 are mounted on the same boom 22a. Since the single boom system 10 (FIG. 2) of the first embodiment of the invention is incorporated in the control system 10a of the second embodiment of the invention, only the differences between the two systems will be described in detail. The components of the system 10a of the second embodiment of the invention which are equivalent to those of the first embodiment will be assigned the same numerals followed by the letter "a". Furthermore, since the components of the auxiliary winch and block assembly 152 and of the auxiliary winch control circuit 82a' are quite similar to those associated with the main winch and block assembly 150, equivalent parts of the auxiliary assembly and winch control circuit will be assigned the same numerals used in the first embodiment of the invention followed by the letter "a'".

Although the auxiliary winch and block assembly 152 is diagrammatically illustrated in FIG. 4 as being disposed outwardly of the main winch and the block assembly 150, it will be understood that the two systems are normally placed side by side on the boom 22a with the axes of the pulleys of the head blocks 42a and 42a' being concentric. The side by side placement of the main and auxiliary winch and block assemblies 150 and 152 enable an operator to more effectively handle objects such as long pipe line sections since the operator may independently control the two assemblies thereby controllably raising or lowering one end of a pipe section relative to the other end.

Because of the addition of the auxiliary winch and block assembly 152 and the auxiliary winch control circuit 82a', the hydraulic pump 86a and pressure relief valve 90a are connected to an auxiliary winch valve 92a' that is operated by a lever 93a' (FIGS. 3 and 4) and is connected in series with the winch valve 92a of the main winch and block assembly 150 and with the boom valve 96a of the boom circuit 80a.

An interlock circuit 84a (FIG. 4) is provided and comprises a pilot line 154 which connects conduit 108a' of the auxiliary winch control circuit 82a' to a manually operated two-way selector valve 156 which includes an auxiliary open position and an auxiliary closed position. When the selector valve 156 is in the illustrated auxiliary open position, a passage 158 in the valve 156 establishes communication between the pilot line 154 and another pilot line 160. When the valve 156 is in the auxiliary closed position, the pilot line 154 is blocked and a U-shaped passage 162 in the valve 156 connects the pilot line 160 with another pilot line 164. The line 164 is connected to the conduit 108a of the main winch control circuit 82a and to a pilot operated check valve 166 which blocks flow of fluid therepast until opened by a pilot pressure which is at least 1/12 the pressure in the pilot line 164. When the pilot operated check valve 166 is opened, fluid flows through pilot line 168 into the pilot operated check valve 134a of the boom actuating circuit 80a. If the pressure in the pilot line 168 is in excess of 1/12 of that in the conduit 136a, the check valve 134a will open and the boom 22a may be extended at a rate determined by the operator as he shifts the valve 96a to its parallel passage position.

In operation of the boom extension control system 10A, it will first be assumed that the hydraulic pump 86a is operating, that the valve 156 is in its auxiliary open position as illustrated in FIG. 4, and that the valves 96a, 92a, and 92a' are in their illustrated neutral positions.

If the operator inattentively attempts to extend the boom 22a by shifting the valve 96a to its parallel passage position without first actuating both of the winch valves 92a and 92a', it will be noted that high pressure fluid will be directed from the pump 86a, through conduits 88a, 94a', 94a, a parallel passage in valve 94a, and into conduit 136a. The pilot operated check valve 134a will block further flow of fluid and accordingly, will prevent the inattentive extension of the boom which might otherwise result in "two-blocking".

When the valve 96a is in its parallel passage position, movement of both winch valves 92a and 92a' into either their parallel passage or cross passage positions will extend the boom 22a. However, if the operator operates only one of the winch valves and leaves the other winch valve in its neutral position, the boom extension control system 10a prevents the boom 22a from being extended as will be described below. It will be understood that the boom may be extended when one winch valve may be set in a lifting position while the other valve may be set in a lowering position.

For example, if the operator moves the auxiliary valve 92a' to its parallel passage position, high pressure fluid will move through the conduit 100a', check valve 102a', conduit 104a', conduit 108a' and will activate brake cylinder 64a' to release the brake 60a'. A small amount of fluid will bleed through bleed orifice 110a' and will return to the sump Sa. However, even though high pressure fluid from conduit 108a' is transmitted through pilot line 154, valve passage 168, and line 160 to activate the pilot check valve 166 thereby permitting flow of fluid into the check valve 134a, it will be appreciated that with valve 92a in its neutral position there will be substantially no pressure within the winch control circuit 82a and accordingly pilot operated boom check valve 134a will not be piloted open. Thus, with one of the winch valves 92a or 92a' in its neutral position and with the boom valve 96a in its parallel passage or extended position, the hydraulic motor controlled by the other winch valve will be hydraulically locked.

If at this time, the winch valve 92a is also shifted to either its parallel or cross passage position, sufficient flow and pressure will enter the main winch control circuit to open check valve 134a. If, for example, the valve 92a has been placed in its cross passage position in order to raise the lifting block 46a, high pressure fluid will continue to flow in the auxiliary winch circuit 82a'. The high pressure fluid will flow from conduit 100a' through the hydraulic motor 54a', through conduits 112a' and 114a', through holding valve 118a', through conduits 122a' and 124a', through a parallel passage in valve 92a', through conduit 94a' and into and through a cross-passage in main winch valve 92a.

Fluid flow will continue through conduit 124a, check valve 106a, conduit 104a and conduit 108a thereby actuating brake cylinder 64a which releases the brake 60a and allowing a small quantity of fluids through bleed orifice 110a into sump Sa. A small portion of fluid also flows at high pressure from conduit 108a through pilot line 164, through energizing check valve 166, and through line 168 thereby energizing check valve 134a permitting fluid to flow therepast in an upward direction (FIG. 4) in the boom circuit 80a. High pressure fluid also flows from conduit 124a, through check valve 116a, conduits 114a and 112a, and through hydraulic motor 54a which transmits power through shaft 56a and gearbox 58a to drive the winch 52a in a direction which will raise the lifting block 46a. Fluid flows out of the motor 54a through conduit 100a, a cross passage in winch control valve 92a, conduit 94a, a parallel passage in boom valve 96a, conduit 136a, open check valve 134a, conduit 132a, and enters the closed end of the boom cylinder 66a thereby extending the boom 22a. Fluid flows from the other end of the boom cylinder 66a through conduit 130a, a parallel passage in the boom valve 96a, and returns to the sump Sa through conduit 98a.

It is apparent, therefore, that in order to energize the pilot operated check valve 134a and thus permit extension of the boom 22a, both the main winch valve 92a and the auxiliary winch valve 92a' must be placed in positions other than the illustrated neutral position. As mentioned previously, when the operator is operating the winch valve 92a and 92a' his attention is directed to the position of each of the moving lifting blocks 46a and 46a' and, accordingly, there will be little danger of "two-blocking" at this time. Moreover, since the boom 22a can be extended only at this time, there is little danger of "two-blocking" due to boom extension.

If a crane that is provided with a boom extension control system 10a (FIG. 4) is to be operated with only its main winch and block assembly 150, the auxiliary winch and block assembly 152 is removed from operative position on the crane and is stored or otherwise deactivated. The two-way selector valve 156 is then shifted to its auxiliary closed position with the U-shaped passage 162 communicating with the pilot lines 160 and 164. Thus, the auxiliary winch circuit 82a' is disconnected from the interlock circuit 84a and has no effect upon the operation of the main winch and block assembly 150. When the two-way valve 156 is in its auxiliary closed position, the main winch and block system 150 is controlled in exactly the same manner as occurred with the boom control system of the first embodiment of the invention except that high pressure fluid in conduit 108a must open both pilot check valves 166 and 134a before the boom 22a can be extended.

The boom extension control system 10b (FIG. 5) of the third embodiment of the invention is arranged to permit boom extension only when the winch 52b is driven in a direction which tends to lower the lifting block 46b.

The boom extension control system 10b (FIG. 5) of the third embodiment of the invention is identical to the first embodiment of the invention except for a change in the interlock circuit 84b, and a change in the location of the pump 86b and pressure relief valve 90b. Accordingly only the difference will be described in detail and parts which are similar to parts of the first embodiment will be given the same numerals followed by the letter "b." It will also be noted that the direction of flow of fluid through the valves 92b and 96b is reversed from that of the first embodiment of the invention.

As indicated in FIG. 5 one of the changes between the control system 10 (FIG. 2) and the control system 10b (FIG. 5) is that the motor 86b and pressure relief valve 90b are connected to the conduit 98b, and that the conduit 88b drains directly into the sump Sb. Another change in the two systems is that the pilot line 138b is connected to the pilot line 120b rather than to the conduit 108b as in the first embodiment of the invention.

In operation, if the operator shifts the boom valve 96b to the cross passage position to extend the boom without first actuating the winch valve 92b, it will be noted that the pilot operated check valve 134 will not be piloted open and accordingly will prevent extension of the boom 22b. The operator must then return the boom valve 96b to its illustrated neutral position.

Fluid will then flow through conduits 98b and 94b to the sump Sb through line 88b. If the operator places the winch valve 92b into its parallel passage position thus raising the lifting block 46b, fluid will flow through conduits 124b, check valve 106b, conduit 104b, conduit 108b and will activate brake cylinder 64b to release the brake 60b. Fluid will also flow through conduit 124b, check valve 116b, conduits 114b and 112b thereby driving the motor 54b which raises the lifting block 46b. The fluid on the downstream side of the motor 54b will return directly to the sump Sb through conduit 100b. The pressure in conduit 100b and pilot lines 120b and 138b will accordingly be insufficient to open the pilot operated check valve 134b. Thus, the operator will not be able to extend the boom 22b when the lifting block is moving upwardly since the closed check valve 134b will block the flow of fluid to the boom cylinder 66b.

When the operator places the winch valve 92b in the cross passage position to lower the lifting block 46b, high pressure fluid will flow through conduit 100b, through check valve 102b, conduit 104b and through conduit 108b thereby actuating brake cylinder 64b to release the brake 60b. Fluid will also flow through conduit 100b through motor 54b thereby driving the winch 52b in a direction which will lower the lifting block 46b. The fluid then flows through conduits 112b and 114b, is blocked by check valve 116b, and accordingly builds up to a pressure of 200 p.s.i. which opens holding valve 118b. Fluid then flows through holding valve 118b, conduits 122b and 124b, a cross passage in valve 92b, and returns to the sump Sb. It will be noted that the holding valve 118b assures that the pressure in conduit 100b and in pilot lines 120b and 138b will be in excess of about 200 p.s.i. and will therefore open the pilot operated check valve 134b. Shifting of the boom valve 96b to its cross passage position will permit fluid to flow in the boom circuit 80b through conduit 136b, check valve 134b, conduit 132b and into the boom cylinder 66b thus extending the boom 22b. Fluid is discharged from the boom cylinder 66b through conduit 130b, a cross passage in the boom valve 96b, through conduit 94b and will return to the sump Sb through the winch circuit 82b and conduit 88b.

Thus, the extension control circuit 10b of the third embodiment of the invention will allow extension of the boom 22b only if the winch is activated to unreel the cable 44, i.e., move the cable in a direction which will tend to lower the lifting block 46b.

Although the direction of fluid in the winch circuits of the several embodiments of the invention have been described in relation to upward or downward movement of the lifting blocks, it will of course be understood that such terms refer to movement of the winch in directions which will respectively, reel in or unwind cable and have been used for more easily visualizing the operation of the control system of the present invention. In this regard, it is to be understood that the lifting block may be maintained at the same elevation when the winch is unwinding cable and the boom is being extended; or conversely, when the cable is being reeled in and the boom is being retracted.

Also, the movement of the pulleys will be affected by pivoting the entire boom about the pivot point 37 (FIG. 1) upon actuation of the cylinders 40 by another circuit (not shown).

From the foregoing description it is apparent that the boom extension control system of the present invention precludes extension of the boom until the operator's attention is directed to the position of the lifting block or blocks relative to the boom as occurs when the operator actuates manually operated controls which place the winch or winches on the boom in operation thereby raising or lowering the lifting blocks or blocks. In this way danger of "two-blocking" is greatly minimized.

In accordance with the third embodiment of the invention the operator cannot extend the boom unless the winch is driven in a direction which will tend to lower the lifting block.

Although the best mode contemplated for carrying out the present invention has been herein shown and described, it will be apparent that modification and variation may be made without departing from what is regarded to be the subject matter of the invention.

What is claimed is:

1. In a crane having an extensible boom, a boom motor for extending or retracting said boom, a boom hydraulic circuit for the operation of said boom motor, a reversibly operated winch having a cable attached to said boom and supporting a vertically movable lifting block, a winch motor for selectively driving said winch in a direction for lifting or lowering the block, a winch hydraulic circuit for operation of said winch motor, the improvement which comprises a check valve in said boom hydraulic circuit normally closed in one direction for precluding operation of said winch motor to lower the block, said boom necting said check valve in the boom hydraulic circuit to the winch hydraulic circuit to open said check valve in said one direction when pressure is applied to one side of said boom motor to extend the boom, a pilot line conhydraulic circuit and motor being independently operable to extend said boom when the check valve is open in an amount and rate of extension independent of the fluid flow through said winch motor.

2. In a crane having an extensible boom, a boom motor for extending or retracting said boom, a boom hydraulic circuit for the operation of said boom motor, a reversibly operated winch having a cable attached to said boom and supporting a vertically movable lifting block, a winch motor for selectively driving said winch in a direction for lifting or lowering the block, a winch hydraulic circuit for operation of said winch motor, the improvement which comprises a check valve in said boom hydraulic circuit normally closed, in one direction for precluding operation of said boom motor to extend the boom, a pilot line connecting said check valve in the boom hydraulic circuit to the winch hydraulic circuit to open said check valve in said one direction when pressure is applied to one side of said hydraulic circuit to extend said boom when the check valve is open in an amount and rate of extension independent of the fluid flow through said winch motor.

3. In a crane having an extensible boom, a boom motor for extending or retracting said boom, a boom hydraulic circuit for the operation of said boom motor, a reversibly operated winch having a cable attached to said boom and supporting a vertically movable lifting block, a winch motor for selectively driving said winch in a direction for lifting or lowering the block, a winch hydraulic circuit for operation of said winch motor, the improvement which comprises a check valve in said boom hydraulic circuit normally closed in one direction for precluding operation of said boom motor to extend the boom, a pilot line connecting said check valve in the boom hydraulic circuit to the winch hydraulic circuit to open said check valve in said one direction when pressure is applied to one side of said winch motor to lower the block, a hydraulic valve in said winch hydraulic circuit to control operation of said winch motor, and a hydraulic valve in said boom hydraulic circuit to control said boom motor when said check valve is open, said boom hydraulic circuit and motor being independently operable to extend said boom when the check valve is open in an amount and rate of extension independent of the fluid flow through said winch motor.

4. In a crane having an extensible boom, a boom hydraulic motor for extending and retracting said boom, a boom hydraulic circuit for the operation of said boom motor, said hydraulic circuit having a boom extend line and a boom retract line connected to said boom motor, a reversibly operated winch having a cable attached to said boom and having a block supported by the cable, a winch motor for selectively driving said winch in a direction for lifting or lowering the block, a winch hydraulic circuit for operation of said winch motor, the improvement which comprises a pressure actuated check valve in said boom extend line normally closed in one direction for precluding operation of said boom motor to extend the boom, said check valve continuously open in the opposite direction to permit operation of said boom motor in the direction to retract the boom at any time, a pilot line connecting said pressure actuated check valve in the boom extend line to the winch hydraulic circuit, a winch control valve in said winch hydraulic circuit to apply pressure to one side or the other of said winch motor for operation thereof in one direction or the other and to apply pressure through said pilot line to said pressure actuated check valve to open the valve when pressure is applied by the winch valve to one side of the winch motor to lower the block, and a hydraulic valve in the boom hydraulic circuit for selective application of pressure to said boom extend line and, when the pressure actuated check valve is open, to said boom motor.

5. In a crane
(a) an extendable boom
(b) an hydraulic piston and cylinder defining a motor to power the boom, said boom motor having an extend chamber to extend the boom on receipt of fluid under pressure therein,
(c) a winch having a cable attached to the boom and having a vertically movable lifting block supported thereby, said winch having a winch motor connected thereto to pay out and take in said cable when the motor is operated in one direction or the other,
(d) a source of fluid under pressure,
(e) a winch circuit including a winch valve connected between said source of fluid under pressure and said winch motor, said winch valve having hydraulic pay-out and take in motor lines extending from the valve to opposite sides of said winch motor,
(f) a boom circuit including a boom valve connected between said source of fluid under pressure and said boom motor, and including an extend motor line extending from the boom valve to said extend chamber, said extend line having a pressure operated check valve therein to permit flow therethrough on retraction of the boom and normally to block flow therethrough in a direction to extend the boom, said check valve operable on the application of pressure thereto to unblock said boom extend line to permit extension of the boom,
(g) and a control line extending from said winch circuit to said check valve to introduce pressure thereto to open the extend line to permit extension of the boom.

References Cited
UNITED STATES PATENTS

| | | | |
|---|---|---|---|
| 3,601,259 | 8/1971 | Olson | 212—55 |
| 3,315,820 | 4/1967 | Stauffer | 212—55 UX |
| 3,481,489 | 12/1969 | Stauffer | 212—55 |
| 2,301,028 | 11/1942 | Esch | 60—97 E |

FOREIGN PATENTS

| | | | |
|---|---|---|---|
| 1,009,780 | 6/1957 | Germany | 212—55 |
| 737,737 | 9/1955 | Great Britain | 212—8 |
| 106,505 | 6/1965 | Norway | 212—8 A |

EVON C. BLUNK, Primary Examiner

M. F. MAFFEI, Assistant Examiner

U.S. Cl. X.R.

212—35

PO-1050
(5/69)

UNITED STATES PATENT OFFICE
CERTIFICATE OF CORRECTION

Patent No. 3,721,350               Dated March 20, 1973

Inventor(s) Oliver T. Nephew

It is certified that error appears in the above-identified patent and that said Letters Patent are hereby corrected as shown below:

Col. 1, line 70, change "he" to --the--.
Col. 2, line 4, change "persent" to --present--;
        line 42, change "which" to --winch--.
Col. 7, line 3, change "10A" to --10a--;
        line 13, change "94a" (third occurrence) to --96a--;
        line 37, change "168" to --158--.
Col. 10, after line 13 and before line 14, insert --of said boom motor to extend the boom, a pilot line con- --.
Col. 10, line 14, delete entire line.
Col. 10, after line 17 and before line 18, insert --of said winch motor to lower the block, said boom--.
Col. 10, after line 37 and before line 38, insert --winch motor, to lower the block, and valve in said boom--.

Col. 10, delete line 18.

Signed and sealed this 11th day of February 1975.

(SEAL)
Attest:

RUTH C. MASON
Attesting Officer

C. MARSHALL DANN
Commissioner of Patents
and Trademarks